United States Patent
Chen et al.

(10) Patent No.: US 12,389,885 B2
(45) Date of Patent: Aug. 19, 2025

(54) INDUSTRIALIZED CULTIVATION METHOD FOR CEPHALOPHOLISSONNERATI FRY

(71) Applicants: Yellow Sea Fisheries Research Institute, Chinese Academy of Fishery Sciences, Qingdao (CN); WanNing LinLan Aquaculture Co., Ltd, Wanning (CN)

(72) Inventors: Songlin Chen, Qingdao (CN); Yu Song, Qingdao (CN); Bo Zhou, Wanning (CN); You Liang, Qingdao (CN); Langhua Wu, Wanning (CN); Sheng Lu, Qingdao (CN); Yang Liu, Qingdao (CN); Tianshi Zhang, Qingdao (CN); Chongwei Wang, Qingdao (CN)

(73) Assignees: Yellow Sea Fisheries Research Institute, Chinese Academy of Fishery Sciences, Qingdao (CN); WanNing LinLan Aquaculture Co., Ltd, Wanning (CN)

( * ) Notice: Subject to any disclaimer, the term of this patent is extended or adjusted under 35 U.S.C. 154(b) by 0 days.

(21) Appl. No.: 18/834,215

(22) PCT Filed: Jul. 10, 2024

(86) PCT No.: PCT/CN2024/104633
§ 371 (c)(1),
(2) Date: Jul. 29, 2024

(65) Prior Publication Data
US 2025/0212851 A1  Jul. 3, 2025

(30) Foreign Application Priority Data
Dec. 28, 2023  (CN) .......................... 202311836209.7

(51) Int. Cl.
A01K 61/17  (2017.01)

(52) U.S. Cl.
CPC .................................. *A01K 61/17* (2017.01)

(58) Field of Classification Search
CPC ........ A01K 61/10; A01K 61/13; A01K 61/17; A01K 61/80
(Continued)

(56) References Cited

U.S. PATENT DOCUMENTS 3,765,372 A * 10/1973 Moe, Jr ................. A01K 61/17
119/217

FOREIGN PATENT DOCUMENTS

CN   102763615 A    11/2012
CN   104737946 A *   7/2015
(Continued)

OTHER PUBLICATIONS

Banrie, "How to Farm Orange-Spotted Grouper", Oct. 22, 2012, The Fish Site; https://thefishsite.com/articles/cultured-aquatic-species-orangespotted-grouper (Year: 2012).*
(Continued)

*Primary Examiner* — Kimberly S Berona
*Assistant Examiner* — Erica Michelle Huebner
(74) *Attorney, Agent, or Firm* — Hawaii Patent Services; Nathaniel K. Fedde; Kenton N. Fedde (57) ABSTRACT

The present disclosure relates to the technical field of marine fish cultivation and breeding, and in particular to an industrialized cultivation method for a *Cephalopholissonnerati* fry. The method includes: a step of sequentially performing food acclimation and nutrient enrichment on a *Cephalopholissonnerati* parent fish under conditions of 25-29° C. of water temperature and running water, to obtain the parent fish with mature gonad development, and other steps.

8 Claims, 2 Drawing Sheets

(58) Field of Classification Search
USPC .......................................................... 119/215
See application file for complete search history.

(56) References Cited

FOREIGN PATENT DOCUMENTS

| | | | | |
|---|---|---|---|---|
| CN | 104798698 | A | | 7/2015 |
| CN | 107372227 | A | * | 11/2017 |
| CN | 108522365 | A | | 9/2018 |
| CN | 108770737 | A | * | 11/2018 |
| CN | 109496924 | A | * | 3/2019 |
| CN | 110100769 | A | | 8/2019 |
| CN | 111183932 | A | * | 5/2020 |
| CN | 111194707 | A | | 5/2020 |
| CN | 111316939 | A | * | 6/2020 |
| JP | 2020000050 | A | | 1/2020 |
| JP | 2021177781 | A | | 11/2021 |
| KR | 102168817 | B1 | | 10/2020 |
| WO | 2020059429 | A1 | | 11/2021 |

OTHER PUBLICATIONS

China National Intellectual Property Administration. Notice of Grant of Invention Patent Right of foreign counterpart 202310593526.4 May 27, 2024.
China National Intellectual Property Administration. First notice of examination opinion of foreign counterpart 202310593526.4 May 10, 2024.

* cited by examiner

INDUSTRIALIZED CULTIVATION METHOD FOR CEPHALOPHOLISSONNERATI FRY

TECHNICAL FIELD

The present disclosure relates to the technical field of marine fish cultivation and breeding, and in particular to an industrialized cultivation method for a *Cephalopholissonnerati* fry.

BACKGROUND

*Cephalopholissonnerati*, also known as *Cephalopholis sonnerati* and red flag grouper, belongs to perciformes and percoidei serranidae *Cephalopholis sonnerati*. The fish body is bright red, with many dark red round spots on the upper half of the body and head. When young, black spots are scattered on the sides of the body. The *Cephalopholissonnerati* is a tropical coastal coral reef fish that inhabits in reef areas and sea areas at outer reef slopes with water depths above 10-100 m or above, and juvenile fishes cruise on sponges or coral reef heads, feeding on small fishes, shrimps, crabs and arthropods.

As a precious marine cultured fish in China, the *Cephalopholissonnerati* is deeply loved by consumers in the market. At present, the population of the wild *Cephalopholissonnerati* has dropped significantly due to overfishing, and the artificial breeding technology for the *Cephalopholissonnerati* in China has not yet achieved a breakthrough. Currently, there are no reports on the successful cultivation for the *Cephalopholissonnerati* fry in industrialized seedlings, nor on the artificial breeding for the *Cephalopholissonnerati* fry. The industrialized seedling has the characteristics of stable water quality conditions, high seedling output per unit of water, and low incidence of breeding diseases. During seedling, the growth and health of the fry can be effectively controlled, large-scale and efficient fry production can be achieved, and a stable supply of fry can be provided, which is of great significance for promoting the development of the breeding industry and improving the breeding efficiency. Therefore, breaking through the artificial breeding technology for the *Cephalopholissonnerati*, establishing the industrialized seedling breeding method and achieving large-scale cultivation of artificially cultured seedlings have become major issues that need to be overcome urgently in the grouper breeding industry.

SUMMARY

To solve the above problems, the present disclosure provides an industrialized cultivation method for a *Cephalopholissonnerati* fry. This cultivation method has the characteristics of stable seedling technology and simple seedling process, can cultivate *Cephalopholissonnerati* in batches and achieve the industrialized breeding and farming for the *Cephalopholissonnerati* fry.

To achieve the above objects, the present disclosure provides the following technical solution:

The present disclosure provides an industrialized cultivation method for the *Cephalopholissonnerati* fry, which includes the following steps:

1) Sequentially performing food acclimation and nutrient enrichment on a *Cephalopholissonnerati* parent fish under conditions of 25-29° C. of water temperature and running water, to obtain the parent fish with mature gonad development;

where the food acclimation includes: feeding fresh fishes to the *Cephalopholissonnerati* parent fish on a fifth day after entering a pond, and replacing the fresh fishes with fresh bonito slices after the status is stabilized;

the nutrient enrichment includes: selecting the parent fish with a weight of 1-2.5 kg and feeding fresh high-protein feed twice a day;

2) Performing natural spawning and insemination on the parent fish with mature gonad development in step 1) to obtain fertilized eggs;

3) Incubating the fertilized eggs obtained in step 2) to a myotome development stage, and then performing incubation in an incubating bag to obtain larvae;

where the condition for incubating the fertilized eggs to the myotome development stage includes: a density of the fertilized eggs being 2 million grains/m$^3$, a water temperature being 26-28° C., a salinity being 32‰, and a pH value being 7.6-8.0;

4) Feeding biological baits to the larvae obtained in step 3), and obtaining the fry after laying eggs for 20 d;

when the larvae are 3-7 days old, feeding SS-type rotifers or copepod nauplii every day at a feeding density of 3-5 pieces/mL;

when the larvae are 8-12 days old, feeding L-type rotifers at a feeding density of 2-3 pieces/mL;

when the larvae are 13-18 days old, feeding *Artemia* nauplii at a feeding density of 1-2 pieces/mL;

when the larvae are 18-24 days old, feeding copepod nauplii at a feeding density of 1-2 pieces/mL;

when the larvae are 25-34 days old, feeding *Artemia* and copepod nauplii at a feeding density of 1-2 pieces/mL;

when the larvae are 35 days old or above, feeding *Artemia* and copepod adults at a feeding density of 1-2 pieces/mL;

5) After temporarily feeding the fry obtained in step 4) for 1 d, performing artificial cultivation in an indoor workshop, including:

A. Cultivation Conditions in the Workshop:

The cultivation water is fresh seawater that has been precipitated, filtered, and disinfected, the cultivation water is regularly tested for pathogens and water quality to prevent the cultivation water carrying pathogens or substandard water quality from affecting fry cultivation; and water quality indexes are controlled as: pH of 7.5-7.9, dissolved oxygen≥5 mg/L, ammonia nitrogen≤0.5 mg/L, nitrite≤0.05 mg/L;

A square cement pond with a size of 4×4×1.2 m and rectangular corners serves as a seedling pond, with a water depth of not less than 1 m, and central aeration and running water cultivation are adopted, and a daily water exchange volume is not less than 200% of the total water volume;

In a seedling period, the cultivation workshop, fry, seedling equipment and seedling workers need to be strictly disinfected to avoid the occurrence of diseases;

B. Fry Selection Method

After transferred to an indoor workshop, the *Cephalopholissonnerati* fry cultivated in an outdoor pond is temporarily cultivated in a net cage in a cement pond and stops eating for 1 day, electrolytic multivitamins are added to the water to relieve the stress of the fry during transportation; during the temporary cultivation, the vitality and swimming conditions of the fry are observed, and those with obvious injuries, deformities or poor condition are promptly picked out; and samples are taken from each pond to detect the fry, a PCR method is used to detect a nervous necrosis virus, and healthy, disease-free, normal-colored and free-swimming *Cephalopholissonnerati* is selected for cultivation;

C. Fry Screening and Pond-Separating Method

After 45 days old and 3-5 cm long, the fry is screened every 7 days, and the number of days of seedling separating gradually increases in the later stage; the fry is screened and the pond is separated to adjust a stocking density and improve a living environment of the fry; anti-stress and disinfection work must be done before and after pond separation to reduce the death of the fry due to stress or scratches on the fish body and infection with pathogens; and screened juvenile fishes are separately poured into the pond according to specifications for an intermediate cultivation process;

D. Standardized Cultivation Method for the Fry

Cultivation environment: during the fry cultivation, a natural light rhythm is adopted, the water temperature is 26-29° C., and feeding in continuous running water is adopted;

Bait feeding: before the body length of the fry reaches 2 cm, the bait is copepod and *Artemia* adults; after the fry gathers in the pond, the bait is fed to the densely populated areas; the feeding amount follows the principle of small amounts and multiple times to avoid affecting the water quality; when the body length of the fry reaches 2-3 cm long, the bait is compound feed with copepods and *Artemia* adults, when feeding, first a small amount of compound feed is fed, and then *Artemia* and the like are fed; and after the body length of the fry reaches 3 cm or more, the artificial compound feed is completely fed, and the daily feeding amount is 8%-10% of the fish weight;

Daily management: during the seedling, paying attention to the stimulation of the fry by an external environment and avoid noise and light affecting the feeding of the fry; decontaminating and changing the water in the seedling pond twice a day, and discharging residual bait and excrement from the bottom of the pond to avoid deteriorating water quality and affecting the survival and development of the fry;

Disease prevention and control: seedling tools are strictly disinfected every day, dedicated to dedicated personnel, and placed in fixed locations; common pathogens in fishes and cultivation water are regularly checked to prevent and control the pathogens as early as possible; sick fishes with obvious symptoms in the seedling pond are promptly picked out and eliminated, and the electrolytic multivitamins and *Bacillus* bacteria are regularly sprinkled throughout the pond to increase fish immunity; and the eliminated fry and dead fry must be treated harmlessly to avoid infecting the healthy fry.

Preferably, the *Cephalopholissonnerati* parent fish in step 1) is subjected to food acclimation and nutrient enrichment in a land-based cement pond, and the land-based cement pond has a size of 8 m×8 m×1.5 m and a water depth of 1.2 m; and a breeding density of the *Cephalopholissonnerati* parent fish is 1-3 fishes/m$^3$.

Preferably, the *Cephalopholissonnerati* parent fish in step 1) stops eating for 2-3 d after entering the pond, the whole pond is subjected to the electrolytic multivitamins in this period, and the usage amount of the electrolytic multivitamins is 0.2 g/m$^3$;

the body length of the fresh fish is 10 cm; and the feeding amount of the fresh fish and fresh bonito slices is 3-5% of the weight of the *Cephalopholissonnerati* parent fish.

Preferably, the nutrient enrichment is performed in the step 1) when the water temperature is 26° C.; and the fresh high-protein feed includes one or more of squid, bonito and shelled oysters, and the feeding amount of the fresh high-protein feed is 3-4% of the weight of the *Cephalopholissonnerati* parent fish.

Preferably, the condition for incubating the fertilized eggs in step 3) to the myotome development stage further includes: stopping the gas supply and standing every 2 h to drain dead eggs and debris sunk to the bottom, and adding fresh new water to the original water level.

Preferably, in step 4), the larvae are fed with biological baits in a larvae cultivation pond, and the larvae cultivation pond is first disinfected and fertilized;

the disinfection treatment includes: exposing to the sun for 5-7 days after removing the attachments on the pond wall, pond bottom and aerator;

after cleaning and discharging black organic matters and moss particles in a sand layer at the bottom of the pond, preparing a bleaching powder solution at a dosage of 30 kg/acre, evenly sprinkling the solution onto the pond wall and bottom, and discharging the bleaching powder solution and adding seawater; and the fertilizer includes: adding fresh *Chlorella* to the pond to keep a water transparency at 35-40 cm; regularly adding a bio-organic fertilizer and EM bacteria; and controlling water quality indexes as: water temperature of being 25-29° C., the specific gravity of seawater of being 1.022-1.024, pH of being 7.5-7.8, dissolved oxygen≥5 mg/L, ammonia nitrogen≤0.5 mg/L, and nitrite≤0.05 mg/L.

Preferably, the whole pond is sprinkled with the electrolytic multivitamins or vitamin C with a final concentration of 0.8-1 ppm at 12 h before the larvae enter the larvae cultivation pond.

Preferably, when the fry is temporarily raised in step 5), the electrolytic multivitamins are added to the water, and the adding amount of the electrolytic multivitamins is 0.2 g/m$^3$.

The *Cephalopholissonnerati* parent fish is 2-5 years old wild *Cephalopholissonnerati* introduced from the Nansha Islands.

In the present disclosure, the egg laying time is 14-16 h after fertilization, and microscopic examination is carried out in the myotome generation period. The proportion of floating fertilized eggs is 80-85%. In the present disclosure, the method for expelling dead eggs and debris is: stopping the oxygen supply in an incubating barrel, fertilized eggs with normal development floating to the surface of the water, while unfertilized eggs, dead eggs and debris sinking to the bottom of the incubating barrel. A drain valve at the bottom of the incubating barrel is opened, to discharge unfertilized eggs, dead eggs and debris, and then new water is added to the original water level and inflation is restored.

The beneficial effects of the present disclosure are as follows:

1. According to the method of the present disclosure, excellent germplasm is ensured through strict selection of parents; the incubating status of the fertilized eggs and the development of the larvae are regularly checked, the incubating environment is optimized and water quality conditions are regulated, to reduce the stress death of the larvae and effectively improve the survival rate of the *Cephalopholissonnerati* larvae.

2. According to the method of the present disclosure, problems of enteritis caused by excessive intake of larvae or the decline of survival rate due to cannibalism caused by too little intake are effectively reduced by feeding different types and densities of baits in various stages of the *Cephalopholissonnerati* larvae.
3. According to the method of the present disclosure, adopting strict fry quality control and disease prevention and control measures in the factory workshop cultivation period effectively optimizes the growth conditions of the fry, improves the growth rate, health status and adaptability of the fry, and at the same time reduces the risk of disease occurrence. Through standardized cultivation management and technical means, the growth environment and feeding management of the fry can be controlled, thus effectively improving the production efficiency.
4. The *Cephalopholissonnerati* cultivated according to the method of the present disclosure has the advantages of fast growth rate, strong disease resistance, strong vitality, delicious meat and good market prospects.

DETAILED DESCRIPTION OF EMBODIMENTS

Figure 1:
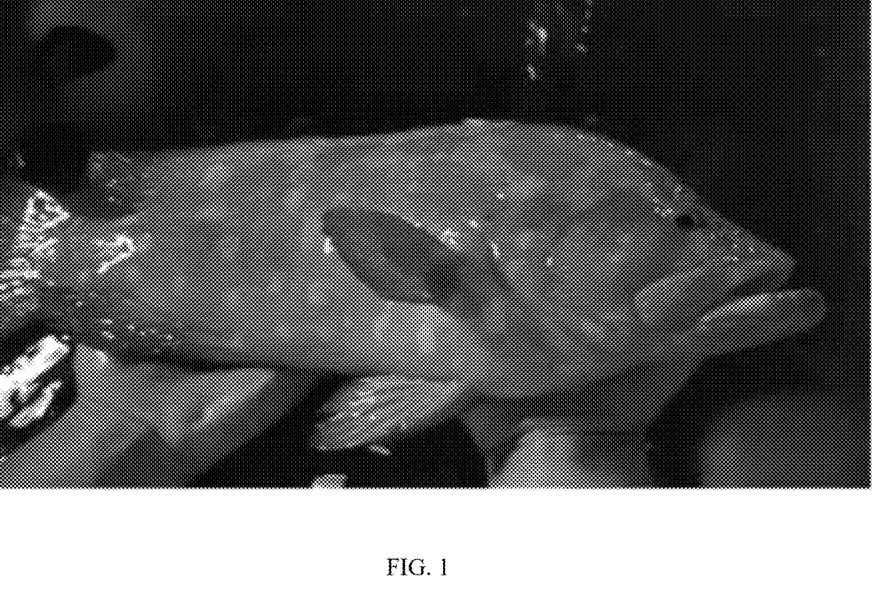
FIG. 1 shows a *Cephalopholissonnerati* parent fish.
Figure 2:
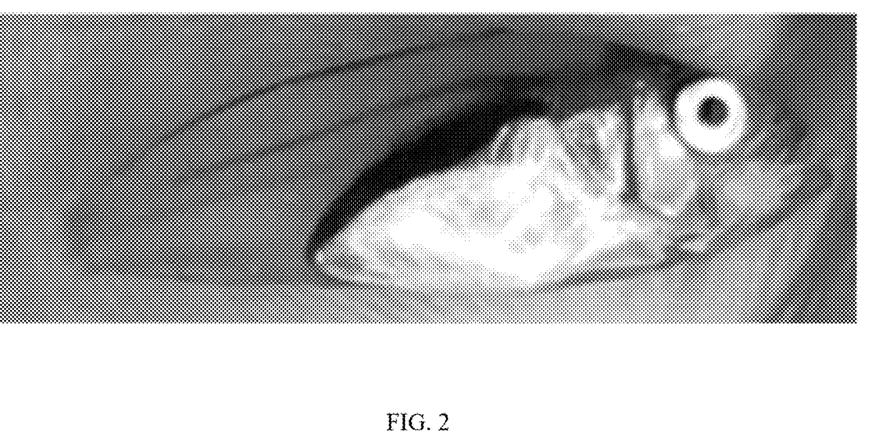
FIG. 2 shows a 30-day-old *Cephalopholissonnerati* fry.
Figure 3:
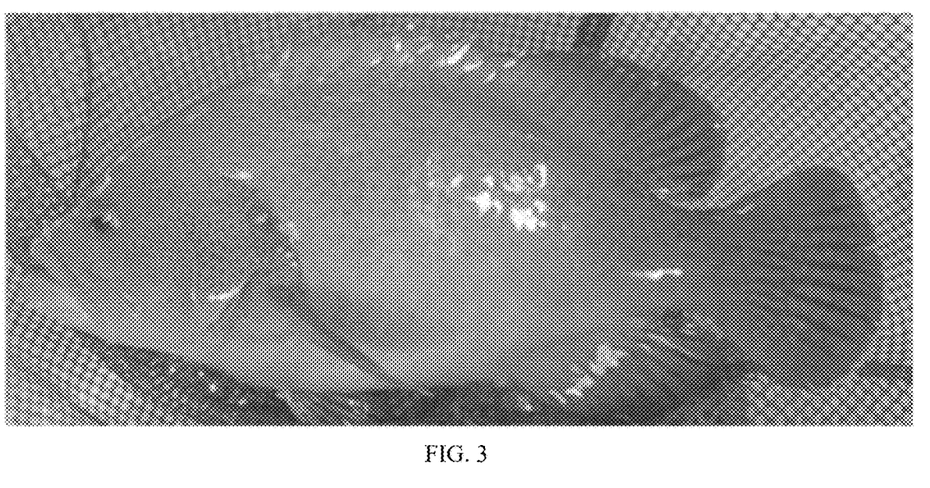
FIG. 3 shows a 6-month-old *Cephalopholissonnerati* fry.

The present disclosure provides an industrialized cultivation method for *Cephalopholissonnerati* fry, which includes the following steps:
1. Establishment of Cultivation Method for a *Cephalopholissonnerati* Parent Fish Land-based cement ponds are used to cultivate the *Cephalopholissonnerati* parent fish, each cement pond has a size of 8 m×8 m×1.5 m, a water depth of 1.2 m, a breeding density of 1-3 fishes/m$^3$ and a water temperature of 25-29° C. The cultivation is carried out under conditions of natural light rhythm, air inflation and running water. The parent fish is screened before entering the pond, and those with abnormal conditions such as damage to the body surface and attachment of parasites are picked out for separate feeding or directly eliminated. The feed is gradually replaced from fresh small fish about 10 cm in size to fresh bonito slices. When feeding, pay attention to controlling the amount of feeding, preferably 3%-5% of the parent fish weight. A wild *Cephalopholissonnerati* parent fish that is 2.5-5 pounds, healthy, disease-free, and energetic serves as the parent, and was moved to the Lingshui fishing raft in Hainan in March 2023, and the water temperature is stable at 26-28° C. Fresh squid, bonito and shelled oysters are fed twice a day for nutrient enrichment to promote further development and maturation of the gonads.
2. Establishment of Artificial Propagation Method for the *Cephalopholissonnerati* Fry The *Cephalopholissonnerati* parent fish with mature gonads is placed in a net cage to spawn naturally and be fertilized. An egg-collecting net is then used to collect fertilized the eggs floating in the net cage. The collected fertilized eggs are placed in an incubating barrel with a drain valve at the bottom thereof, and the incubation conditions are that the water temperature is 26-28° C., the salinity 32‰ and the pH value 7.6-8.0. During incubation, the gas supply is stopped to stand every 2 h, dead eggs and debris sunk to the bottom are drained, and fresh new water is added to the original water level. After the fertilized egg embryos have developed to the myotome development stage, the floating fertilized eggs are collected and put into packaging bags to prepare for transportation.
3. Establishment of Artificial Cultivation Method for the *Cephalopholissonnerati* Fry
(1) Pond Cleaning and Fertilizer for the Larvae Cultivation Pond After a high-pressure water gun is used to wash away the attachments on the pond wall, pond bottom and aerator, the pond wall, pond bottom and aerator are exposed to the sun for 5-7 days. A bleaching powder solution is prepared according to the dosage of 30 kg/acre, and the solution is evenly sprinkled onto the pond wall and bottom to kill harmful organisms. After 24 h, the bleaching powder solution is drained and seawater is added. Basic biological baits are cultivated at 1-3 days before incubation. Fresh *Chlorella* is added to the pond to maintain water transparency at 35-40 cm. Bio-organic fertilizers and photosynthetic bacteria are regularly added to the pond water to increase water nutrition.
(2) Incubation of Fertilized Eggs Fresh seawater filtered through a 150-mesh screen is injected into the incubating bag, air stones are placed at 25 cm below the water surface, and one air stone is placed per square meter for continuous oxygenation. After laying eggs, a beaker is used to observe the incubation of the fertilized eggs every 2-3 h. If larvae appear, the air volume is turned down in time and micro-inflation is maintained. Three days after laying eggs and incubating, eyespots have appeared in the larvae, mouth clefts have formed, and the yolk sac has been exhausted. At this time, the incubating bag is untied to allow the larvae to enter the pond. Before opening the bag, electrolytic multivitamins are sprinkled throughout the pond to relieve the stress of the larvae.
(3) Breeding and Release of Larvae and Juvenile Fish from the Pond After opening the bag, the beaker is used to take pond water every day and observe the amounts of biological baits in the pond. If the bait is insufficient, SS-type rotifers or copepod nauplii need to be put into the pond; about 15 days after opening the bag, the larvae will metamorphose into juvenile fish, with enlarged mouth clefts and increased food intake. The copepod adults fortified with a mixture of *Chlorella*+amino acids+electrolytic multivitamins need to be fed; as the activity of the larvae increases, the aeration volume gradually increases to ensure stable dissolved oxygen content in the pond. The juvenile fish is ready to be released from the pond after about 30 days of cultivation.

The juvenile fish stops eating one day before leaving the pond, and vitamin C is sprinkled in the entire pond 12 h before fishing to avoid stress damage to the fry; the water is drained to a depth of 1 m, the net is pulled for 2-3 times depending on the number of fry, and the number of juvenile fish is collected and estimated.
4. Establishment of Artificial Cultivation Method for the *Cephalopholissonnerati* Fry in Indoor Workshop
(1) Workshop Cultivation Conditions The cultivation water is fresh seawater that has been precipitated, filtered, and disinfected. The cultivation water is regularly tested for pathogens and water quality to prevent the cultivation water carrying pathogens or substandard water quality from affecting the fry cultivation. Water quality indexes are controlled as: pH of 7.5-7.9, dissolved oxygen≥5 mg/L, ammonia nitrogen≤0.5 mg/L, and nitrite≤0.05 mg/L.

A square cement pond with a size of 4×4×1.2 m and rectangular corners serves as a seedling pond, with a water depth of not less than 1 m, and central aeration and running water cultivation are adopted, and a daily water exchange volume is not less than 200% of the total water volume.

In a seedling period, the cultivation workshop, fry, seedling equipment and seedling workers need to be strictly disinfected to avoid the occurrence of diseases.

(2) Fry Selection Method

After the *Cephalopholissonnerati* fry cultivated in the outdoor pond is transferred to the indoor workshop, the *Cephalopholissonnerati* fry is placed in the net cage in the cement pond and temporarily raised without feeding food for 1 day. The electrolytic multivitamins are added to the water to relieve the stress of the fry during transportation. During the temporary raising, the vitality and swimming conditions of the fry are observed, and those with obvious injuries, deformities, and poor condition are promptly picked out. Each pond is sampled to detect the fry, a PCR method is used to detect NNV, and healthy, disease-free, normal-colored and free-swimming *Cephalopholissonnerati* is selected for cultivation.

(3) Fry Screening and Pond-Separating Method

After 45 days old, the fry is different in individual due to different feeding abilities and growth rates, and the phenomenon of "big fish eating small fish" occurs. When the larger fry has the insufficient mouth cleft to swallow a smaller fry, the situation that the big fish gets stuck and the small fish is bitten to death occurs. Therefore, fry sieves of different specifications need to be used to separate the fry according to body size, and fine and soft nylon mesh sieves serve as the fry sieves. When the fry is 3-5 cm long, the fry is screened every 7 days, and the number of days of seedling separating gradually increases in the later stage; the fry is screened and the pond is separated to adjust a stocking density and improve a living environment of the fry; anti-stress and disinfection work must be done before and after pond separation to reduce the death of the fry due to stress or scratches on the fish body and infection with pathogens; and screened juvenile fishes are separately poured into the pond according to specifications for an intermediate cultivation process.

(4) Standardized Cultivation Method for the Fry

Cultivation environment: during the fry cultivation, a natural light rhythm is adopted, the water temperature is 26-29° C., and feeding in continuous running water is adopted.

Bait feeding: before the body length of the fry reaches 2 cm, the bait is copepod and *Artemia* adults; after the fry gathers in the pond, the bait is fed to the densely populated areas; the feeding amount follows the principle of small amounts and multiple times to avoid affecting the water quality; when the body length of the fry reaches 2-3 cm long, the bait is compound feed with copepods and *Artemia* adults, when feeding, first a small amount of compound feed is fed, and then *Artemia* and the like are fed; and after the body length of the fry reaches 3 cm or more, the artificial compound feed is completely fed, and the daily feeding amount is 8%-10% of the fish weight. The feeding amount is adjusted according to the size and density of the fry, so as to ensure that the feeding needs of the fry are met without affecting the water quality. Leftovers are drained promptly after feeding.

Daily management: during the seedling, paying attention to the stimulation of the fry by an external environment and avoid noise and light affecting the feeding of the fry; decontaminating and changing the water in the seedling pond twice a day, and discharging residual bait and excrement from the bottom of the pond to avoid deteriorating water quality and affecting the survival and development of the fry.

Disease prevention and control: seedling tools are strictly disinfected every day, dedicated to dedicated personnel, and placed in fixed locations; common pathogens in fishes and cultivation water are regularly checked to prevent and control the pathogens as early as possible; sick fishes with obvious symptoms in the seedling pond are promptly picked out and eliminated, and the electrolytic multivitamins and *Bacillus* bacteria are regularly sprinkled throughout the pond to increase fish immunity; and the eliminated fry and dead fry must be treated harmlessly to avoid infecting the healthy fry.

(5) Growth Performance Test of the *Cephalopholissonnerati* Fry

The weight and full length of the *Cephalopholissonnerati* fry in the industrialized cultivation workshop are regularly measured, and the number of the surviving *Cephalopholissonnerati* fry is counted to evaluate the growth performance of the *Cephalopholissonnerati* fry.

To further illustrate the present disclosure, the method for expelling dead eggs and debris is as follows: stopping the oxygen supply in the incubating barrel, fertilized eggs with normal development floating to the surface of the water, while unfertilized eggs, dead eggs and debris sinking to the bottom of the incubating barrel, where a drain valve at the bottom of the incubating barrel is opened, to discharge the unfertilized eggs, dead eggs and debris, and then new water is added to the original water level and inflation is restored.

In order to further illustrate the present disclosure, the present disclosure is described in detail below with reference to the examples, but these examples should not be understood as limiting the protection scope of the present disclosure.

Example 1

Cultivation Method for a *Cephalopholissonnerati* Parent Fish

The cultivation quality of the *Cephalopholissonnerati* parent fish is directly related to the development of fertilized eggs and the survival and growth of seedlings. Therefore, strengthening the cultivation of parents can effectively improve the success rate of artificial cultivation of seedlings. The steps mainly include: improvement of cultivation conditions, food acclimation and nutrient enrichment, etc. The specific method are as follows:

(1) Improvement of Cultivation Conditions

Land-based cement ponds were used to cultivate the *Cephalopholissonnerati* parent fish, each cement pond had a size of 8 m×8 m×1.5 m, a water depth of 1.2 m, a breeding density of 2 fishes/m$^3$ and a water temperature of 25-29° C. The cultivation was carried out under conditions of natural light rhythm, air inflation and running water.

(2) Food Acclimation

The parent fish was screened before entering the pond, and those with abnormal conditions such as damage to the body surface and attachment of parasites were picked out for separate feeding or directly eliminated. After entering the pond, feed was stopped for 3 days. During this period, the entire pond was sprinkled with electrolytic multivitamins at a dosage of 0.2 g/m$^3$ to reduce the stress response of the parent fish. Five days after entering the pond, the food was mainly fresh small fish with a size of about 10 cm. After the condition of the parent fish stabilized, the feed was gradually replaced with fresh bonito slices. When feeding, paid attention to controlling the amount of feeding, preferably 3%-5% of the parent fish body weight. The uneaten bait residues were cleaned promptly.

(3) Nutrient Enrichment

The *Cephalopholissonnerati* weighing 1-2.5 kg, with a complete body, no disease, no injury, no deformity, and strong vitality was selected as the parent. When the water temperature raised to 26° C., nutrient enrichment was carried out. Fresh high-protein feed such as squid, bonito and shucked oysters was fed twice a day to promote gonadal development and maturation. The daily feeding amount was 3%-4% of the parent fish weight.

Example 2

Artificial Propagation Method for the *Cephalopholissonnerati* Fry (1) Egg Laying and Fertilization After the intensified cultivation, the gonad development of the parent fish was observed daily. The abdomen of female *Cephalopholissonnerati* with mature gonads was swell and soft, and the ovaries had obvious outlines and were elastic when touched. A small amount of milky white semen flowed out when the abdomen of a mature male fish was gently pressed. The *Cephalopholissonnerati* parent fish with mature gonads was placed in a net cage to spawn naturally and be fertilized. Fertilized eggs floating in the net cage were collected by using an egg-collecting net, and the collected fertilized eggs were placed in an incubating barrel.

(2) Incubation of the Fertilized Eggs

The incubating bucket had a volume of 200 L and a drain valve at the bottom thereof. The fertilized eggs were placed in an incubating barrel for incubation, and the density of fertilized eggs was 2 million/m³. The incubation conditions were water temperature of being 26-28° C., salinity of being 32‰, and pH value of being 7.6-8.0. During incubation, stopped the gas supply and stood once every 2 h, drained out the dead eggs and debris sunk to the bottom, and added new water to the original water level. When the fertilized egg embryo developed to the myotome development stage, the fertilized egg embryo could be packaged and transported to the pond for incubation.

Example 3

Artificial Cultivation Method for the *Cephalopholissonnerati* Fry

Artificial cultivation method for the *Cephalopholissonnerati* fry include: the steps of disinfecting and fertilizing the larvae cultivation pond, incubating fertilized eggs, feeding biological bait, and releasing the fry from the pond. The specific operations of the above steps are as follows:

(1) Disinfection and Fertilization of the Larvae Cultivation Pond

A high-pressure water gun was used to wash away the attachments on the pond wall, pond bottom and aerator, and the pond wall, pond bottom and aerator were exposed to the sun for 7 days. After cleaning and discharging black organic matters and moss particles in the sand layer at the bottom of the pond, a bleaching powder solution was prepared at a dosage of 30 kg/acre and the solution was evenly sprinkled onto the pond wall and bottom to kill harmful organisms. The bleaching powder solution was drained and seawater was added. Basic biological bait was cultivated 3 days before incubation. Fresh *Chlorella* was added to the pond to maintain water transparency at 35-40 cm. EM bacteria were regularly added to the pond water at a dosage of 1 g/m³ to increase water nutrition and cultivate plankton. During cultivation, the water quality was regularly tested, and the water quality indexes were controlled as: the water temperature of being 25-29° C., a specific gravity of seawater of being 1.022-1.024 (salinity 29-32), the pH of being 7.5-7.8, dissolved oxygen≥5 mg/L, ammonia nitrogen≤0.5 mg/L, and nitrite≤0.05 mg/L.

(2) Incubation of the Fertilized Eggs

Incubation of fertilized eggs: the incubating bag was filled with fresh seawater filtered through a 150-mesh screen, air stones were placed 25 cm below the water surface, and one air stone was placed per square meter for continuous oxygenation. When laying eggs, the packing bag containing fertilized eggs was first put into the incubating bag to be soaked for 15 min to balance the temperature difference, then ⅓ of the new water was poured into the packing bag, and then the fertilized eggs were poured out; after laying eggs, a beaker was used to observe the incubation of the fertilized eggs every 2 h. During incubation, the air volume was increased, if larvae appeared, the air volume was turned down in time and micro-inflation was maintained. Three days after laying eggs, eyespots appeared in the larvae, mouth clefts were about to form, and the yolk sac was exhausted. At this time, the incubating bag was untied and the larvae were allowed to enter the pond. 12 h before opening the bag, electrolytic multivitamin or vitamin C with a concentration of 1 ppm was sprinkled on the entire pond to relieve stress and nutritional balance of the larvae.

(3) Feeding Biological Baits

After opening the bag, the beaker was used to take the pond water every day to observe the number of biological baits in the pond, and the number of plankton was controlled by controlling the usage amount of the *Chlorella* and fertilizing paste.

When the larvae were 3-7 days old, SS-type rotifers or copepod nauplii with a size of ≤100 μm was fed every day, and the feed density in the pond was kept at 3-5 pieces/mL.

When the larvae were 8-12 days old, nutritionally enhanced L-type rotifers were fed, with a feeding density of 2-3 pieces/mL.

When the larvae were 12-18 days old, the feed gradually changed from L-shaped rotifers to *Artemia* nauplii, with a density of 1-2 pieces/mL.

After the larvae were 18 days old or more, 1-2 pieces/mL of copepod nauplii started to be fed.

25 days old juvenile fishes were fed with 1-2 pieces/mL of *Artemia* and small copepods, and 35 days old juvenile fishes were fed with 1-2 pieces/mL of *Artemia* and copepod adults.

(4) Fry Out of the Pond

After laying eggs for about 20 days, the feeding and swimming conditions of the juvenile fish were observed to determine whether they can leave the pond. The juvenile fishes stopped eating one day before leaving the pond, and 12 h before fishing, electrolytic multivitamins with a final concentration of 0.2 g/m³ were poured into the entire pond to avoid stress damage to the fry; the pond was drained to a depth of 1 m, the net was pulled for 2-3 times depending on the number of fry, and the number of the juvenile fishes was collected and estimated.

Example 4

Artificial Cultivation Method for the *Cephalopholissonnerati* Fry in Indoor Workshop The *Cephalopholissonnerati* larvae collected from the outer pond were transferred to the indoor workshop for standardized cultivation. The specific steps are as follows:

(1) Workshop Cultivation Conditions

The cultivation water was fresh seawater that had been precipitated, filtered, and disinfected. The cultivation water was regularly tested for pathogens and water quality to prevent the cultivation water carrying pathogens or substandard water quality from affecting the fry cultivation. Water quality indexes were controlled as: pH of 7.5-7.9, dissolved oxygen≥5 mg/L, ammonia nitrogen≤0.5 mg/L, and nitrite≤0.05 mg/L.

A square cement pond with a size of 4×4×1.2 m and rectangular corners was adopted as a seedling pond, with a water depth of 1 m, and central aeration and running water cultivation were adopted, and a daily water exchange volume was 200% of the total water volume.

In a seedling period, the cultivation workshop, fry, seedling equipment and seedling workers needed to be strictly disinfected to avoid the occurrence of diseases.

(2) Fry Selection Method

After transferred to an indoor workshop, the *Cephalopholissonnerati* fry cultivated in an outdoor pond was temporarily cultivated in a net cage in a cement pond and stopped eating for 1 day, electrolytic multivitamins were added to the water to relieve the stress of the fry during transportation; during the temporary cultivation, the vitality and swimming conditions of the fry were observed, and those with obvious injuries, deformities or poor condition were promptly picked out; and samples were taken from each pond to detect the fry, a PCR method is used to detect NNV, and healthy, disease-free, normal-colored and free-swimming *Cephalopholissonnerati* was selected for cultivation.

(3) Fry Screening and Pond-Separating Method

After 45 days old, the fry was different in individual due to different feeding abilities and growth rates, and the phenomenon of "big fish eating small fish" occurred. When the larger fry had the insufficient mouth cleft to swallow a smaller fry, the situation that the big fish got stuck and the small fish was bitten to death occurred. Therefore, fry sieves of different specifications needed to be used to separate the fry according to body size, and fine and soft nylon mesh sieves served as the fry sieves. When the fry was 3-5 cm long, the fry was screened every 7 days, and the number of days of seedling separating gradually increased in the later stage; the fry was screened and the pond was separated to adjust a stocking density and improve a living environment of the fry; anti-stress and disinfection work were done before and after pond separation to reduce the death of the fry due to stress or scratches on the fish body and infection with pathogens; and the screened juvenile fishes were poured into the pond according to specifications for an intermediate cultivation process.

(4) Standardized Cultivation Method for the Fry

Cultivation environment: during the fry cultivation, a natural light rhythm was adopted, the water temperature was 26-29° C., and the fishes were raised in continuous running water, and the breeding density depended on the specification of the fry.

Bait feeding: before the body length of the fry reached 2 cm, the bait was copepod adults and *Artemia* adults; after the fry gathered in the pond, the bait was fed to the densely populated areas; the feeding amount followed the principle of small amounts and multiple times to avoid affecting the water quality; when the body length of the fry reached 2-3 cm long, the bait was compound feed with copepods and *Artemia* adults, when feeding, first a small amount of compound feed was fed, and then *Artemia* and the like were fed; and after the body length of the fry reached 3 cm or more, the artificial compound feed was completely fed, and the daily feeding amount was 8%-10% of the fish weight. The feeding amount was adjusted according to the size and density of the fry, so as to ensure that the feeding needs of the fry were met without affecting the water quality. Leftovers were drained promptly after feeding.

Daily management: during the seedling, paid attention to the stimulation of the fry by an external environment and avoided noise and light affecting the feeding of the fry; decontaminated and changed the water in the seedling pond twice a day, and discharged residual bait and excrement from the bottom of the pond to avoid deteriorating water quality and affecting the survival and development of the fry.

Disease prevention and control: seedling tools were strictly disinfected every day, dedicated to dedicated personnel, and placed in fixed locations; common pathogens in fishes and cultivation water were regularly checked to prevent and control the pathogens as early as possible; sick fishes with obvious symptoms in the seedling pond were promptly picked out and eliminated, and the electrolytic multivitamins and *Bacillus* bacteria were regularly sprinkled throughout the pond to increase fish immunity; and the eliminated fry and dead fry were treated harmlessly to avoid infecting the healthy fry.

Example 5 Growth Performance Test of the *Cephalopholissonnerati* Fry

The weight and full length of the *Cephalopholissonnerati* fry in the industrialized cultivation workshop were measured, the growth performance of the *Cephalopholissonnerati* fry was evaluated, and the existing number and survival rate of the *Cephalopholissonnerati* fry were counted, and a 30-fish *Cephalopholissonnerati* head fry was randomly selected, and the weight and full length of the *Cephalopholissonnerati* fry were measured using a weighing scale with an accuracy of 0.1 g and a 0.1 mm of ruler. The results in the table below show that the average weight growth rate of red melon seed grouper fry was 2.19 g/day, the average body length growth rate was 0.11 cm/day, no large-scale diseases occurred during the breeding process. In April 2023, 13,000 screened *Cephalopholissonnerati* fries were collected and put into the factory seedling workshop for cultivation. In November 2023, the number of surviving *Cephalopholissonnerati* fry was counted at 11,500, and the cultivation survival rate was 88.5%.

TABLE 1

Weight and full length results of the *cephalopholissonnerati* fry

|  |  | Two-month old | Five-month old | Six-month old | Seven-month old |
|---|---|---|---|---|---|
| *cephalopholissonnerati* | Length (cm) | 7.5 cm | 17.6 cm | 20.6 cm | 23.9 cm |
|  | Weight (g) | 14.6 g | 127.1 g | 200.0 g | 342.7 g |

Although the above examples describe the present disclosure in detail, they are only part rather than all of the examples of the present disclosure. People can also obtain other examples based on those examples without any inventive step, and these examples all belong to the protection scope of the present disclosure.

What is claimed is:

1. An industrialized cultivation method for *Cephalopholissonnerati* fry, said method comprising the following steps:
   a) sequentially performing food acclimation and nutrient enrichment on *Cephalopholissonnerati* parent fish under conditions of 25-29° C. of water temperature and running water so as to obtain the parent fish with mature gonad development;
      wherein the food acclimation comprises feeding fresh fish to the *Cephalopholissonnerati* parent fish on a fifth day after entering a parent pond, and replacing the fresh fish with fresh bonito slices after the *Cephalopholissonnerati* parent fish is stabilized; and
      wherein the nutrient enrichment comprises selecting the parent fish with a weight of 1-2.5 kg and feeding fresh high-protein feed twice a day;
   b) performing natural spawning and insemination on the parent fish with mature gonad development and a weight of 1-2.5 kg to obtain fertilized eggs;
   c) incubating the fertilized eggs to a myotome development stage, and then performing incubation in an incubating bag to obtain larvae;
      wherein incubating the fertilized eggs to the myotome development stage comprises incubating at a density of the fertilized eggs being 2 million grains/m$^3$, a water temperature being 26-28° C., a salinity being 32‰, and a pH value being 7.6-8.0;
   d) feeding biological baits to the larvae and obtaining fry from the larvae 20 days after laying eggs, wherein the feeding biological baits comprises:
      when the larvae are 3-7 days old, feeding SS-type rotifers or copepod nauplii every day at a feeding density of 3-5 pieces/mL;
      when the larvae are 8-12 days old, feeding L-type rotifers at a feeding density of 2-3 pieces/mL;
      when the larvae are 13-18 days old, feeding *Artemia* nauplii at a feeding density of 1-2 pieces/mL;
      when the larvae are 18-24 days old, feeding copepod nauplii at a feeding density of 1-2 pieces/mL;
      when the larvae are 25-34 days old, feeding *Artemia* and copepod nauplii at a feeding density of 1-2 pieces/mL;
      when the larvae are 35 days old or above, feeding *Artemia* and copepod adults at a feeding density of 1-2 pieces/mL;
   e) after feeding the fry derived 20 days from laying eggs, transporting the fry to and performing artificial cultivation in an indoor workshop, said indoor workshop comprising:
      cultivation water, said cultivation water comprising fresh seawater that has been precipitated, filtered, and disinfected, the cultivation water being periodically tested for pathogens and water quality to prevent cultivation water which may be carrying pathogens or substandard water quality from affecting fry cultivation; and water quality indexes are controlled as: pH of 7.5-7.9, dissolved oxygen≥5 mg/L, ammonia nitrogen≤0.5 mg/L, and nitrite≤0.05 mg/L;
      a seedling pond having a size of 4×4×1.2 m and rectangular corners, with a water depth of not less than 1 m, and central aeration and running water cultivation are adopted, and a daily water exchange volume is not less than 200% of the total water volume;
      wherein, during a seedling period, the indoor workshop, the fry, seedling equipment and seedling workers are disinfected to avoid occurrence of diseases;
   f) selecting fry, wherein the fry are selected by a method comprising:
      after the fry are transferred to the indoor workshop, the fry cultivated in the seedling pond are temporarily cultivated in a net cage in the seedling pond and not fed for 1 day and electrolytic multivitamins are added to the water to relieve the stress of the fry during transportation;
      during the temporary cultivation, the vitality and swimming conditions of the fry are observed, and those with obvious injuries, deformities or poor condition are picked out; and
      samples of the fry are taken from the seedling pond wherein a PCR method is used to detect a nervous necrosis virus, and healthy, disease-free, normal-colored and free-swimming fry are selected for cultivation;
   g) screening and separating fry, wherein screening and separating the fry comprises:
      after 45 days old and 3-5 cm long, the fry are initially screened every 7 days, and length of time between fry screenings gradually increases at later stages; the fry are screened and separated into different ponds to adjust stocking density and improve a living environment of the fry;
      anti-stress and disinfection work are done before and after separating the fry to reduce the death of the fry due to stress or scratches on the fry body and infection with pathogens; and
      screened juvenile fish matured from the fry are separately poured into new ponds according to specifications for an intermediate cultivation process;
   h) cultivating the fry, wherein the method of cultivating the fry comprises:
      providing a cultivation environment comprising:
         a natural light rhythm,
         the cultivation water temperature is 26-29° C.; and
      feeding said fry in continuous running water, wherein;
         before the fry reach a body length of 2 cm, bait is fed to the fry wherein said bait is copepod and *Artemia* adults;
         after the fry gather in the seedling pond, bait is fed to densely populated areas; feeding amount follows a principle of small amounts and multiple times a day to avoid affecting the water quality;
         when the fry body length reaches 2-3 cm, the bait is compound feed with copepods and *Artemia* adults, wherein when feeding;
            first a small amount of compound feed is fed, and then *Artemia* are fed and after the fry body length reaches 3 cm or more, compound feed with copepods and *Artemia* adults is completely fed at 8%-10% of the fish weight per day;
      daily management comprising:
         during the seedling period, adjusting external stimulation environment of the fry to avoid noise and light affecting the feeding of the fry,
         decontaminating and changing of the water in the seedling pond twice a day, and discharging residual bait and excrement from the seedling pond to avoid deteriorating water quality and affecting survival and development of the fry; and disease prevention and control comprising:
- disinfecting seedling tools daily by dedicated personnel and placed in fixed locations;
- checking periodically for pathogens in fish and cultivation water to prevent and control the pathogens as early as possible;
- removing and eliminating sick fish with obvious pathogenic symptoms and dead fry from the seedling pond; and
- sprinkling throughout the seeding pond on a regular schedule electrolytic multivitamins and *Bacillus* bacteria to increase fish immunity.

2. The industrialized cultivation method for *Cephalopholissonnerati* fry according to claim 1, wherein the *Cephalopholissonnerati* parent fish in step a) is subjected to food acclimation and nutrient enrichment in a parent pond, wherein the pond has a size of 8×8×1.5 m$^3$ and a water depth of 1.2 m; and
a breeding density of the *Cephalopholissonnerati* parent fish is 1-3 fish/m$^3$.

3. The industrialized cultivation method for *Cephalopholissonnerati* fry according to claim 1, wherein the *Cephalopholissonnerati* parent fish in step a) stops eating for 2-3 days after entering the pond, wherein the whole pond is subjected to electrolytic multivitamins during this period, and the usage amount of the electrolytic multivitamins is 0.2 g/m$^3$;
the body length of the fresh fish is 10 cm; and
the *Cephalopholissonnerati* parent fish are fed fresh fish and fresh bonito slices at 3-5% of the weight of the *Cephalopholissonnerati* parent fish.

4. The industrialized cultivation method for *Cephalopholissonnerati* fry according to claim 1, wherein the nutrient enrichment is performed in step a) when the water temperature is 26° C.; and
the fresh high-protein feed comprises one or more of squid, bonito, and shelled oysters, and fed at 3-4% of the weight of the *Cephalopholissonnerati* parent fish.

5. The industrialized cultivation method for *Cephalopholissonnerati* fry according to claim 1, wherein incubating the fertilized eggs in step c) to the myotome development stage further comprises: stopping the gas supply in the seedling pond and allowing the water within the seedling pond to still every 2 hours during incubation to discharge dead eggs and allow debris to sink to the bottom of the seedling pond and; adding fresh water to the original water level.

6. The industrialized cultivation method for *Cephalopholissonnerati* fry according to claim 1, wherein in step d), the larvae are fed with biological baits in the seedling pond following disinfection and fertilization of the seedling pond;
the disinfection treatment comprises exposing to sunlight 5-7 days after removing attachments on a wall of the seedling pond, a bottom of the seedling pond and an aerator;
after cleaning and discharging black organic matter and moss particles in a sand layer at the bottom of the pond, preparing a bleaching powder solution at a dosage of 30 kg/acre, sprinkling the solution onto the seedling pond wall and bottom, and discharging the bleaching powder solution and adding seawater; and
fertilization comprises adding fresh *Chlorella* to the pond to keep a water transparency of 35-40 cm; adding a bio-organic fertilizer and EM bacteria; and controlling water quality indexes as: water temperature being 25-29° C., the specific gravity of seawater being 1.022-1.024, pH being 7.5-7.8, dissolved oxygen≥5 mg/L, ammonia nitrogen≤0.5 mg/L, and nitrite≤0.05 mg/L.

7. The industrialized cultivation method for *Cephalopholissonnerati* fry according to claim 6, wherein the whole seedling pond is sprinkled with the electrolytic multivitamins or vitamin C with a final concentration of 0.8-1 ppm 12 hours before the larvae enter the seedling pond.

8. The industrialized cultivation method for *Cephalopholissonnerati* fry according to claim 4, wherein when the fry are temporarily raised during the transportation in step e), the electrolytic multivitamins are added to the water, and the adding amount of the electrolytic multivitamins is 0.2 g/m$^3$.

* * * * *